United States Patent
Zhuang et al.

(10) Patent No.: US 12,326,985 B1
(45) Date of Patent: Jun. 10, 2025

(54) DIGITAL TRAJECTORY PREDICTION SYSTEM

(71) Applicants: Jianming Zhuang, Singapore (SG); Hossameldin Mohammed, Langley (CA); Hong Li, Coquitlam (CA)

(72) Inventors: Jianming Zhuang, Singapore (SG); Hossameldin Mohammed, Langley (CA); Hong Li, Coquitlam (CA)

(73) Assignee: SUNIA PTE. LTD., Tanjong Pager (SG)

( * ) Notice: Subject to any disclaimer, the term of this patent is extended or adjusted under 35 U.S.C. 154(b) by 0 days.

(21) Appl. No.: 18/445,954

(22) Filed: Apr. 15, 2024

(51) Int. Cl.
 *G06F 3/0354* (2013.01)

(52) U.S. Cl.
 CPC ................... *G06F 3/0354* (2013.01)

(58) Field of Classification Search
 CPC ............... G06F 3/0354; G06F 3/0488
 USPC ......................................... 345/179
 See application file for complete search history.

(56) References Cited

U.S. PATENT DOCUMENTS

| | | | | |
|---|---|---|---|---|
| 8,913,032 B2 * | 12/2014 | Kikuchi | .............. | G06F 3/04186 345/174 |
| 8,952,908 B2 * | 2/2015 | Ohta | ................... | G06F 3/04883 345/173 |
| 2013/0100018 A1 * | 4/2013 | Honji | ................... | G06F 3/0416 345/157 |

* cited by examiner

*Primary Examiner* — Calvin C Ma

(57) ABSTRACT

A digital trajectory prediction system includes a preprocess unit serving to receive an input trajectory from an input device for preforming a preprocessing on the input trajectory to form a processed trajectory. A neural network prediction model serves to receive the processed trajectory and to output a prediction result including a predicted point. A post-processing unit serves to perform a post-processing on the prediction result for determining whether to add the predicted point to a render point set. A point output unit serves for rendering the render point set. When the predicted point is added to the render point set in the post-processing, the input trajectory and the predicted point are rendered on a screen. When the predicted point is not added to the render point set in the post-processing, only the input trajectory is rendered on the screen.

18 Claims, 8 Drawing Sheets

DIGITAL TRAJECTORY PREDICTION SYSTEM

FIELD OF THE INVENTION

The present invention is related to a digital trajectory processing, and in particular to a digital trajectory prediction system.

BACKGROUND OF THE INVENTION

Writing, sketching and drawing on electronic devices (tablets, e-readers, mobile phones, demonstration screens, etc.) can introduce a problem of latency between an input source (stylus, mouse or user's finger) and the rendering and displaying of trajectories on the screen. Due to processing, rendering and input sensor signal interference delays, a user usually experiences latency during writing, sketching or drawing on the electronic devices.

When the user writes, sketches or draws on an electronic device (tablets, e-readers, mobile phones, demonstration screens, etc.) by using an input source (stylus, mouse or user's finger), a plurality of input points are captured from the input source by the electronic device and are usually processed and rendered on a screen of the electronic device by using multiple buffers that aim to reduce visual tearing in the user experience. However, processing of the input points with the buffers is in many cases slower than the speed of user's input action (writing, sketching or drawing), which creates some noticeable delays between user's input action and the rendering of the input points on the screen. The delay is what causes the latency associated with the displaying of writing, sketching or drawing on the screen of the electronic device. The latency can be anywhere between 50 to 100 milliseconds in many electronic devices.

As a result, it would be useful if there is a prediction system that can predict user's future input points at specific intervals and display predicted the input points in the latency time span to reduce the latency for making the user experience as close as possible to writing, sketching and drawing on a physical paper. However, developing of the system still has many main challenges including the generality and specificity of the prediction of the system in certain cases such as different input speeds, different input styles, inconsistent input point intervals and extraction quality of the input points.

Therefore, the present invention desires to provide a novel invention to solve above problem of above prior arts.

SUMMARY OF THE INVENTION

Accordingly, for improving above mentioned defects in the prior art, the object of the present invention is to provide a digital trajectory prediction system. The present invention provides a system for predicting a future trajectory at specific frequencies to compensate for the delay between the input trajectory on the input device (tablets, e-readers, mobile phones, demonstration screens, touchscreen devices, etc.) and the rendered trajectory on the screen. In the present invention, a neural network prediction model based on machine learning is combined with a non-machine learning model, preprocessing and post-processing. The input trajectory is preprocessed for predicting a predicted point to be used as a future input point of the input trajectory at a specific interval. The predicted point is adjusted in the post-processing for obtaining an appropriate trajectory to be rendered on the screen. Therefore, the latency of the input device can be reduced, which provides as realistic user experience as possible in various cases of writing, sketching and drawing on different input devices with stylus, mouse or user's finger.

To achieve above object, the present invention provides a digital trajectory prediction system comprising: a processor connected to a memory; the processor serving to execute required operations of the digital trajectory prediction system; and the memory serving to store data, programs and related operation results of the digital trajectory prediction system; a preprocess unit serving to receive an input trajectory from an input device for preforming a preprocessing on the input trajectory; the input trajectory of the input device being inputted by an input unit; the input trajectory including a plurality of input points which are a recent pre-specified set of coordinates captured by input device; wherein in the preprocessing, the input trajectory is processed by a filtering and a smoothing to form a processed trajectory including a plurality of processed points; a neural network prediction model connected to the preprocess unit; the neural network prediction model serving to receive the processed points from the preprocess unit and to output a prediction result including a predicted point; the neural network prediction model using the processed points to form a historical path for predicting the predicted point; the predicted point being used as a new future input point for the input trajectory; a post-processing unit connected to the neural network prediction model and the preprocess unit; the post-processing unit serving to receive the prediction result from the neural network prediction model, the input trajectory and the processed trajectory from the preprocess unit, and to perform a post-processing on the prediction result; wherein in the post-processing, the post-processing unit serves to calculate a straightness, an input length and an input speed of the processed trajectory for determining whether to add the predicted point to a render point set to be rendered on a screen; and the render point set includes the input points of the input trajectory; a point output unit connected to the post-processing unit, the preprocess unit and the screen; the point output unit serving to receive the render point set outputted from the post-processing unit for rendering the render point set on the screen; and wherein in the point output unit, when the predicted point is added to the render point set in the post-processing of the post-processing unit, the input points of the input trajectory and the predicted point are rendered on the screen; and when the predicted point is not added to the render point set in the post-processing of the post-processing unit, only the input points of the input trajectory are rendered on the screen and the predicted point is not rendered on the screen.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
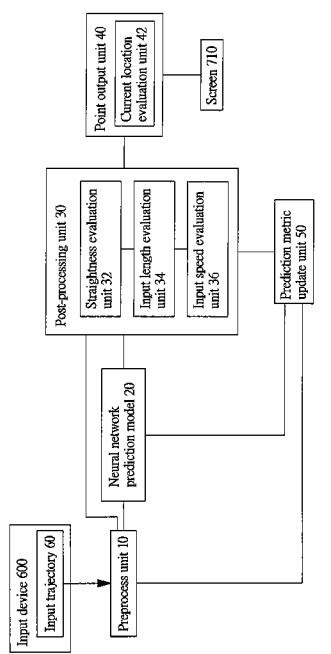
FIG. 1 is a structured block diagram showing the elements of the present invention.
Figure 2:
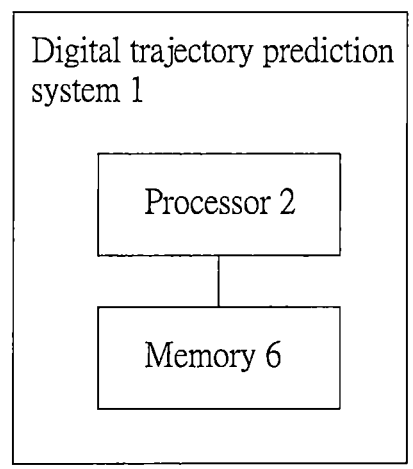
FIG. 2 is a structured block diagram showing the elements of the system of the present invention.

With reference to FIGS. 1 to 8, a digital trajectory prediction system 1 of the present invention is illustrated. Referring to FIG. 2, the digital trajectory prediction system 1 includes a processor 2 and a memory 6. The processor 2 is connected to the memory 6 and serves to execute required operations of the digital trajectory prediction system 1. The memory 6 serves to store data, programs and related operation results of the digital trajectory prediction system 1. Referring to FIG. 1, the digital trajectory prediction system 1 further includes the following elements.

Figure 3:
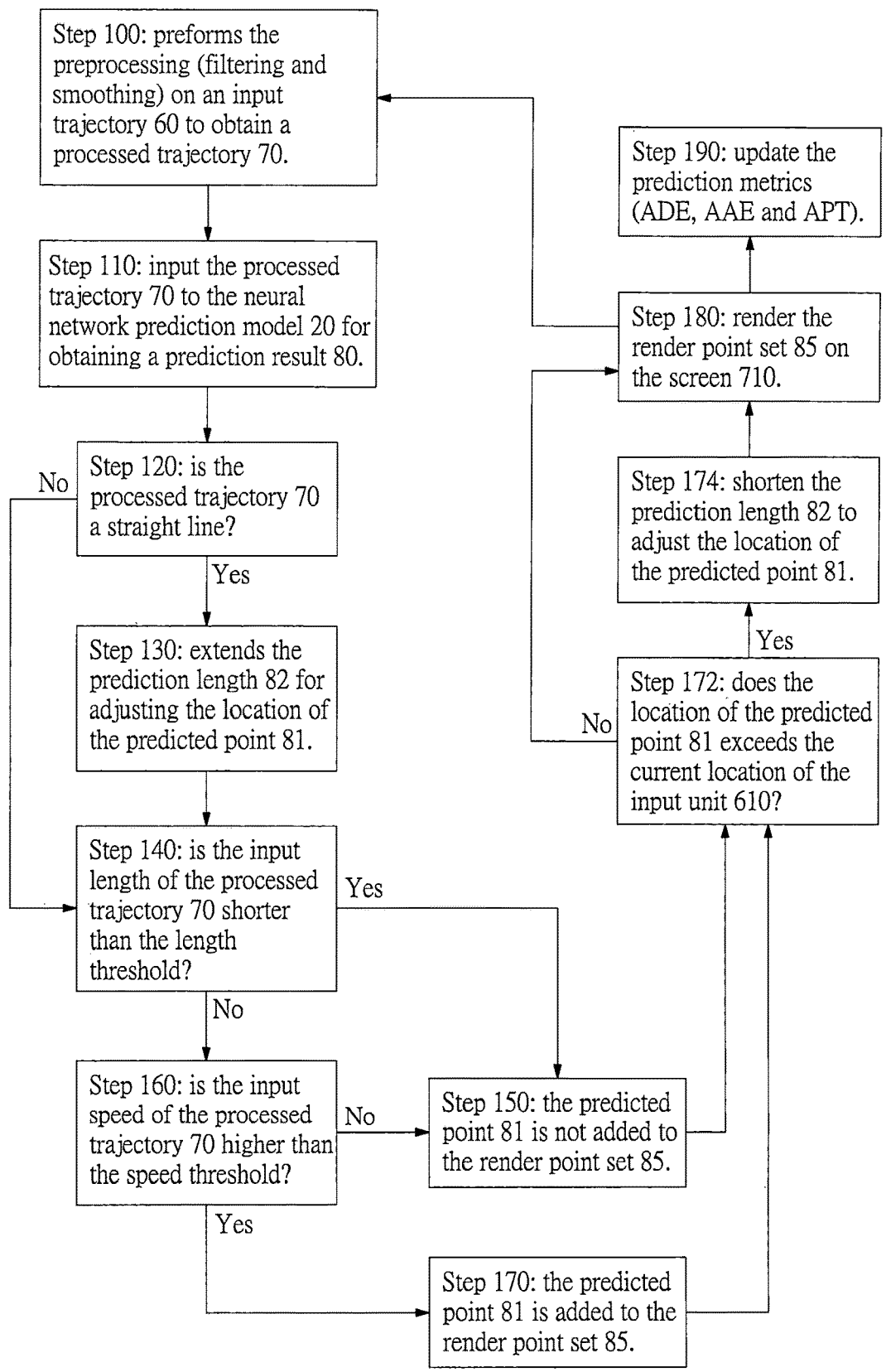
FIG. 3 is a steps flow diagram showing the preprocessing, predicting and post-processing of the present invention.

A preprocess unit 10 serves to receive an input trajectory 60 from an input device 600 for preforming a preprocessing on the input trajectory 60 (step 100 of FIG. 3). The input trajectory 60 of the input device 600 is inputted by an input unit 610. The input trajectory 60 includes a plurality of input points 61 which are a recent pre-specified set of coordinates captured by input device 600. Each of the input points 61 is associated with a time stamp. The input device 600 is an electronic device such as a mobile phone, a tablet, an e-reader, a demonstration screen or a touchscreen device. The input unit 610 may be a stylus, a mouse or fingers of a user.

In the preprocessing, the input trajectory 60 is processed by a filtering and a smoothing to form a processed trajectory 70 including a plurality of processed points 71 which have uniform time stamp intervals. In the filtering and the smoothing of the preprocessing, the input points 61 are resampled and smoothed through a Bézier curve approximation to form the processed points 71 which have the uniform time stamp intervals. Preferably, the time stamp interval between each two consecutive processed points 71 of processed trajectory 70 is 8 ms (millisecond). Filtering and smoothing the input points 61 by the preprocess unit 10 is necessary to maximize the potential prediction accuracy of the present invention since the input points 61 from the input device 600 are data in a raw form having non-uniform time stamp intervals. The input trajectory 60 and the processed trajectory 70 are stored in the memory 6.

A neural network prediction model 20 is connected to the preprocess unit 10. In the present invention, the neural network prediction model 20 is formed by deep neural networks (DNN) using deep learning. The neural network prediction model 20 serves to receive the processed points 71 from the preprocess unit 10 and to output a prediction result 80 including a predicted point 81 (step 110 of FIG. 3). The neural network prediction model 20 uses the processed points 71 to form a historical path for predicting the predicted point 81. The predicted point 81 is used as a new future input point 61 for the input trajectory 60.

Figure 5:
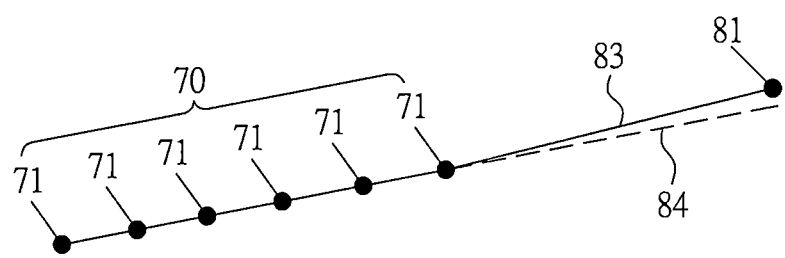
FIG. 5 is a schematic view showing the extending of the prediction length.

The prediction result 80 further includes a prediction length 82 corresponded to the predicted point 81. Referring to FIG. 5, the prediction length 82 is a length of a prediction line 83 connected between the predicted point 81 and the processed point 71 which has the latest time stamp in the processed trajectory 70.

Figure 4:
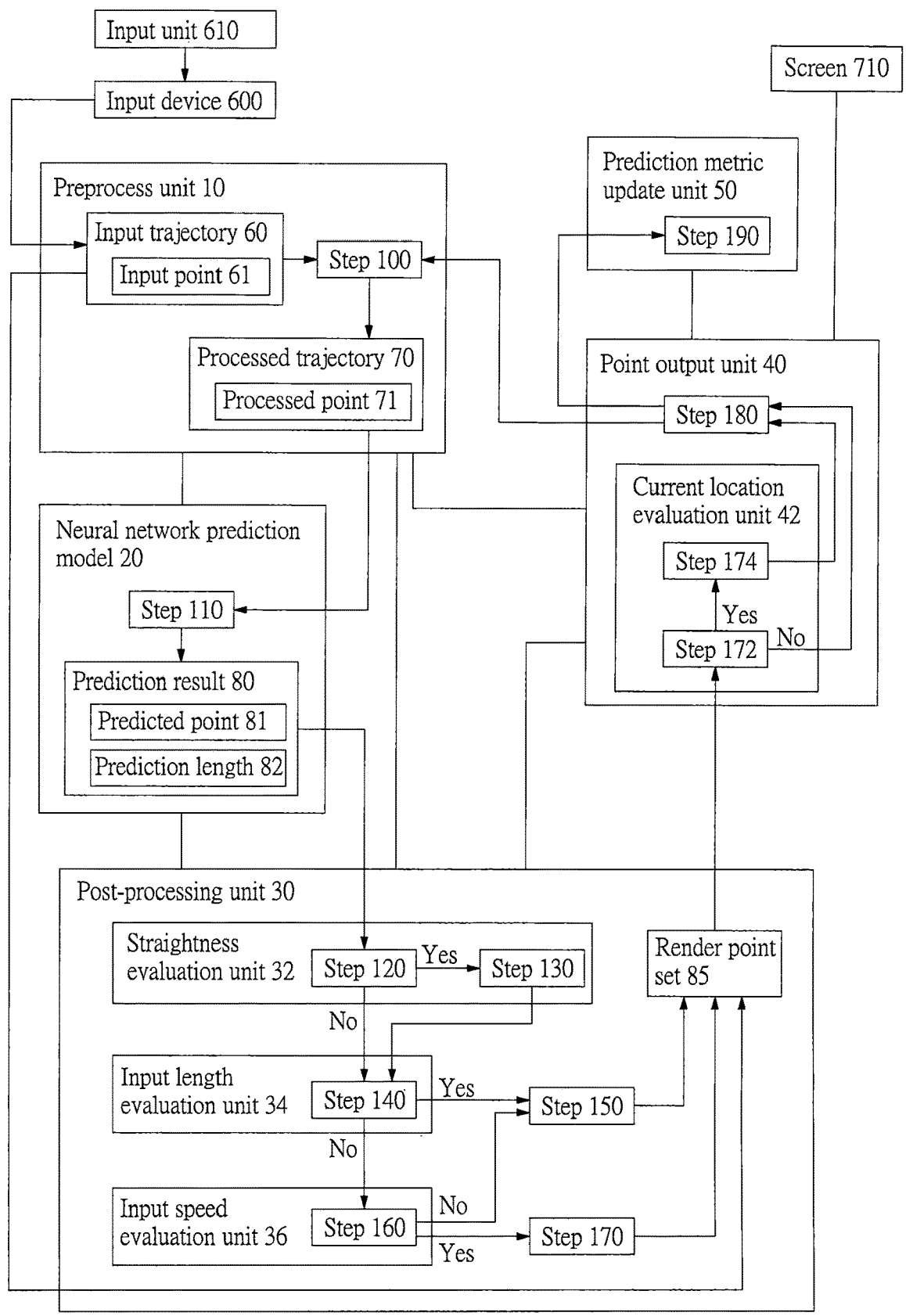
FIG. 4 is a structured block diagram showing the elements related to the preprocessing, predicting and post-processing of the present invention.

A post-processing unit 30 is connected to the neural network prediction model 20 and the preprocess unit 10. Referring to FIGS. 3 and 4, the post-processing unit 30 serves to receive the prediction result 80 from the neural network prediction model 20, the input trajectory 60 and the processed trajectory 70 from the preprocess unit 10, and to perform a post-processing on the prediction result 80. In the post-processing, the post-processing unit 30 serves to calculate a straightness, an input length and an input speed of the processed trajectory 70 for determining whether to add the predicted point 81 to a render point set 85 to be rendered on a screen 710. The render point set 85 includes the input points 61 of the input trajectory 60.

Referring to FIGS. 1 and 4, the post-processing unit 30 includes a straightness evaluation unit 32, an input length evaluation unit 34 and an input speed evaluation unit 36. The post-processing is performed by the straightness evaluation unit 32, the input length evaluation unit 34 and the input speed evaluation unit 36.

Referring to FIG. 3, the straightness evaluation unit 32 serves to calculate a degree of the straightness of the processed trajectory 70 for determining whether the processed trajectory 70 is a straight line (step 120). The straightness is calculated by a line metric based on a frequency and a magnitude of changes in a direction along the processed trajectory 70. The straightness is compared with a predetermined straightness threshold. When the straightness is larger than the straightness threshold, the straightness evaluation unit 32 views the processed trajectory 70 as a straight line and extends the prediction length 82 by stretching the prediction line 83 with a predetermined length at an angle of the prediction line 83 for adjusting the location of the predicted point 81 (step 130), as shown in FIG. 5. The processed trajectory 70 and the predicted point 81 which is adjusted are outputted to the input length evaluation unit 34 for calculating the input length of the processed trajectory 70 (step 140). When the straightness is smaller than the straightness threshold, the processed trajectory 70 is viewed as a non-straight line (such as a curve) and the prediction length 82 is not extended and the location of the predicted point 81 is not adjusted. The processed trajectory 70 and the predicted point 81 which is not adjusted are outputted to the input length evaluation unit 34 for calculating the input length of the processed trajectory 70 (step 140).

The reason for adjusting the location of the predicted point 81 according to the straightness of the processed trajectory 70 is that a prediction error of extending a prediction length 82 for non-straight line is expected to be more than that of a straight line. Referring to FIG. 5, extending the prediction length 82 for the processed trajectory 70 which is a straight line would have a much smaller prediction error, since that if a difference between the angle of the prediction line 83 and an angle of a ground truth line 84 (corresponding to ground truth points which are ideal expected output points in a training stage of the neural network prediction model 20) is not large, extending the prediction length 82 will not make the predicted point 81 deviate away much more from the ground truth point compared to a more difficult case for a curve.

The input length evaluation unit 34 is connected to the straightness evaluation unit 32. In step 140 in FIG. 3, the input length evaluation unit 34 serves to calculate the input length of the processed trajectory 70 for determining whether the input length is shorter than a predetermined length threshold. When the input length is shorter than the length threshold, the predicted point 81 is not added to the render point set 85 (step 150), which gives a better user experience since a shorter input length will decrease the prediction accuracy in theory.

The input speed evaluation unit 36 is connected to the input length evaluation unit 34. In step 140, in the input length evaluation unit 34, when the input length is longer than the length threshold, the input length evaluation unit 34 outputs the processed trajectory 70 and the predicted point 81 to the input speed evaluation unit 36. Referring to FIG. 3, the input speed evaluation unit 36 serves to calculate the input speed of the processed trajectory 70 by using the input length and the time stamps of processed trajectory 70 for determining whether the input speed is higher than a predetermined speed threshold (step 160). When the input speed is higher than the speed threshold, the predicted point 81 is added to the render point set 85 (step 170). When the input speed is lower than the speed threshold, the predicted point 81 is not added to the render point set 85 (step 150), which gives a better user experience since a slower input speed input gives the system more time for rendering and causes less latency.

A point output unit 40 is connected to the post-processing unit 30, the preprocess unit 10 and the screen 710. The point output unit 40 serves to receive the render point set 85 outputted from the post-processing unit 30 for rendering the render point set 85 on the screen 710 (step 180), and to control the preprocess unit 10 to perform the preprocessing (step 100) again for processing a next input trajectory 60 from the input device 600. At least one input point 61 of the input trajectory 60 is used to form a part of the next input trajectory 60.

In step 180 in FIG. 3, in the point output unit 40, when the predicted point 81 is added to the render point set 85 in the post-processing of the post-processing unit 30, the input points 61 of the input trajectory 60 and the predicted point 81 are rendered on the screen 710. Therefore, the perceived latency can be reduced or eliminated by rendering the predicted point 81 on the screen. When the predicted point 81 is not added to the render point set 85 in the post-processing of the post-processing unit 30, only the input points 61 of the input trajectory 60 are rendered on the screen 710 and the predicted point 81 is not rendered on the screen 710, which gives a better user experience.

The point output unit 40 includes a current location evaluation unit 42 connected to the input device 600. When the render point set 85 includes the predicted point 81, the current location evaluation unit 42 serves to evaluate the location of the predicted point 81 against a current location of the input unit 610 on the input device 600 for deciding whether to shorten the prediction length 82 to adjust the location of the predicted point 81 before rendering of the predicted point 81 (step 172). The current location of the input unit 610 is a location of a latest recorded input point 61 of the input device 600 and the latest recorded input point 61 is not rendered yet on the screen 710 due to a processing latency. When the location of the predicted point 81 exceeds the current location of the input unit 610, the prediction length 82 is cut back for adjusting the location of the predicted point 81 (step 174), which avoids the location of the predicted point 81 exceeds the current location of the input unit 610 on the input device 600.

Whenever the preprocess unit 10 receives a new input trajectory 60 from the input device 600, the new input trajectory 60 is preprocessed by the preprocess unit 10 for being inputted to the neural network prediction model 20 to obtain a new predicted point 81. Therefore, for a specific number of consecutive input trajectories 60 from the input device 600 over a predetermined analysis period of time, the neural network prediction model 20 outputs a plurality of respective predicted points 81. Whether or not each of the predicted points 81 will be rendered on the screen 710 is decided by the post-processing of the post-processing unit 30.

A prediction metric update unit 50 is connected to the post-processing unit 30, the neural network prediction model 20 and the preprocess unit 10. When the point output unit 40 renders the render point set 85 on the screen 710 and controls the control the preprocess unit 10 to perform the preprocessing (step 100) again, the prediction metric update unit 50 serves to calculate a plurality of prediction metrics (step 190). The prediction metrics serve for comparing a plurality of predicted points 81 and a plurality of actual recorded input points 61. The predicted points 81 are obtained by the neural network prediction model 20 for a specific number of consecutive input trajectories 60 inputted to the preprocess unit 10 over a predetermined analysis period of time. Each of the predicted points 81 is corresponded to a respective one actual recorded input point 61 which is recorded by the input device 600 at a later time. The prediction metric update unit 50 updates the prediction metrics for each of the input trajectories 60.

The plurality of prediction metrics are three prediction metrics which are an average distance error (ADE), an average angle error (AAE) and an average prediction time (APT). In calculating of the three prediction metrics, a total number of the predicted points 81 over the predetermined analysis period of time is defined as n. Each of the predicted points 81 is represented as $(X_{pi}, Y_{pi})$, $1 \leq i \leq n$. Each of the actual recorded input points 61 is represented as $(X_{t_i}, Y_{t_i})$, $1 \leq i \leq n$. A prediction time of each of the predicted points 81 is represented as $PT_i$, $1 \leq i \leq n$. A predicted vector corresponded to the predicted points 81 is represented as $A=(A_1, A_2, \ldots, A_{n-1}, A_n)$. A ground truth vector corresponded to the predicted points 81 is represented as $B=(B_1, B_2, \ldots, B_{n-1}, B_n)$.

The three prediction metrics are:

$$ADE = \frac{\sum_{i=1}^{n} \sqrt{(X_{p_i} - V_{t_i})^2 + (Y_{p_i} - Y_{t_i})^2}}{n}$$

$$AAE = \cos^{-1} \frac{A \cdot B}{\|A\|\|B\|} = \cos^{-1} \frac{\sum_{i=1}^{n} A_i B_i}{\sqrt{\sum_{i=1}^{n} A_i^2} \times \sqrt{\sum_{i=1}^{n} B_i^2}}, \text{ and}$$

$$APT = \frac{\sum_{i=1}^{n} PT_i}{n}.$$

Figure 6:
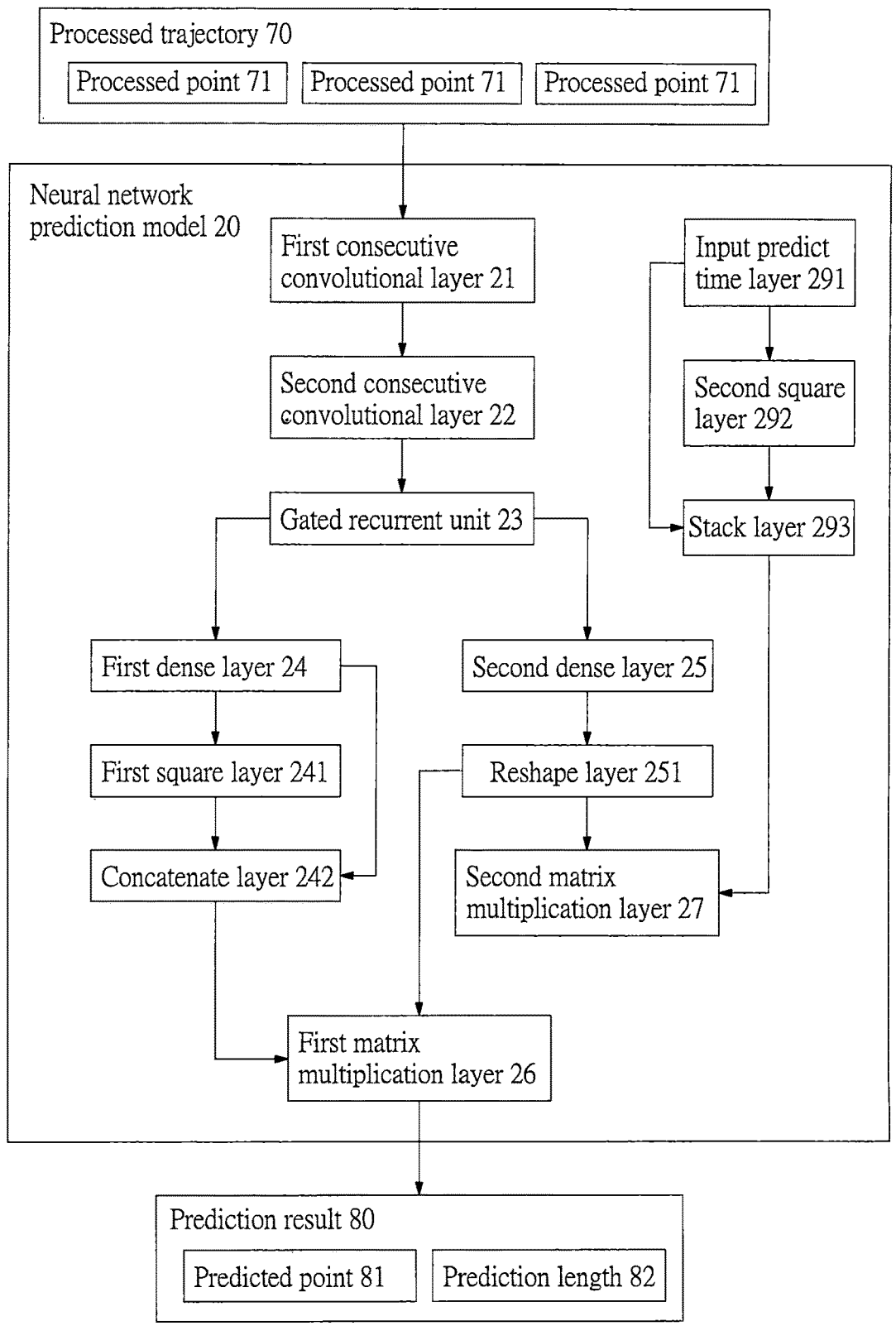
FIG. 6 is a structured block diagram showing the elements of the neural network prediction model of the present invention.

Referring to FIG. 6, the neural network prediction model 20 includes a first consecutive convolutional layer 21, a second consecutive convolutional layer 22, a gated recurrent unit 23, a first dense layer 24, a second dense layer 25 and a first matrix multiplication layer 26. The second consecutive convolutional layer 22 is connected to the first consecutive convolutional layer 21. The gated recurrent unit 23 is connected to the second consecutive convolutional layer 22. The first dense layer 24 and the second dense layer 25 are connected to the gated recurrent unit 23.

In the predicting of the neural network prediction model 20, the processed points 71 inputted to the neural network prediction model 20 are passed through the first consecutive convolutional layer 21, the second consecutive convolutional layer 22 and the gated recurrent unit 23 in sequence. Two outputs of the gated recurrent unit 23 are passed to the first dense layer 24 and the second dense layer 25 respectively. The first dense layer 24 is a representation of the prediction time, and the second dense layer 25 is a representation of a position, a speed and a plurality of acceleration vectors. Two outputs of the first dense layer 24 are passed to a first square layer 241 and a concatenate layer 242 respectively. An output of the first square layer 241 is passed to the concatenate layer 242. An output of the second dense layer 25 is passed to a reshape layer 251. The first matrix multiplication layer 26 receives an output of the concatenate layer 242 and an output of the reshape layer 251 for evaluating coordinates of the predicted point 81. The reshape layer 251 is connected to a second matrix multiplication layer 27 which serves for predicting 8 candidate points. In the evaluating of the first matrix multiplication layer 26, one of the 8 candidate points is selected as the predicted point 81 to be outputted based on the three prediction metrics (AAE, ADE and APT).

In the neural network prediction model 20, the predicted point 81 is represented as $(X_p, Y_p)=(a_x, a_y)*0.5t^2+(v_x, v_y)*t$, wherein $a_x$ and $a_y$ are components of an acceleration, and $v_x$ and $v_y$ are components of a speed. The sign "*" means pairwise multiplication.

The neural network prediction model 20 further includes an input predict time layer 291, a second square layer 292 connected to the input predict time layer 291, a stack layer 293 connected to the input predict time layer 291, the second square layer 292 and the second matrix multiplication layer 27. Above elements are known components of neural network in prior art. Therefore, the details of features of these elements are not explained herein.

The neural network prediction model 20 has a plurality of model parameters which are trained based on a loss function. The loss function is defined by the average distance loss (ADL), the average angle loss (AAL), the average prediction time loss (APTL), a prediction time variance loss (PTVL), a slope change loss (SCL), a velocity change loss (VCL), and a plurality of hyper-parameters which are represented as $c_{ADL}$, $c_{AAL}$, $c_{APTL}$, $c_{PTVL}$, $c_{SCL}$ and $c_{VCL}$.

The ADL, AAL and APTL have the same definition as the ADE, AAE and APT, respectively. The PTVL is a variance of the prediction times of the n predicted points 81 over the predetermined analysis period of time. The SCL is a slope change of n input points 61 over the predetermined analysis period of time. The VCL is a velocity change of the n input points 61 over the predetermined analysis period of time. The loss function is represented as:

$$\text{Loss}=c_{ADL}\text{ADL}+c_{AAL}\text{AAL}+c_{APTL}\text{APTL}+c_{PTVL}\text{PTVL}+c_{SCL}\text{SCL}+c_{VCL}\text{VCL}.$$

Figure 7:
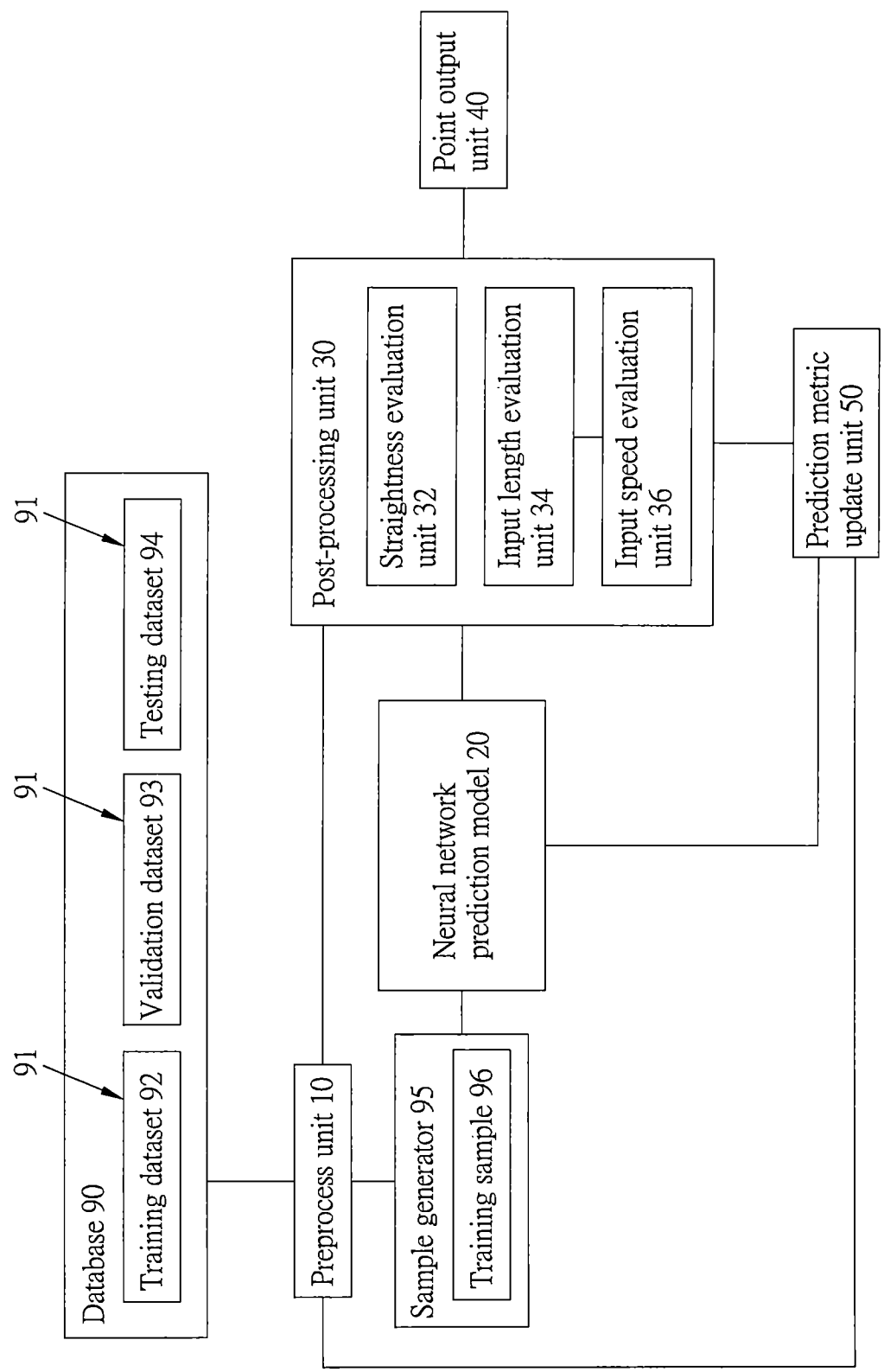
FIG. 7 is a structured block diagram showing elements related to the training stage and testing stage of the neural network prediction model of the present invention.
Figure 8:
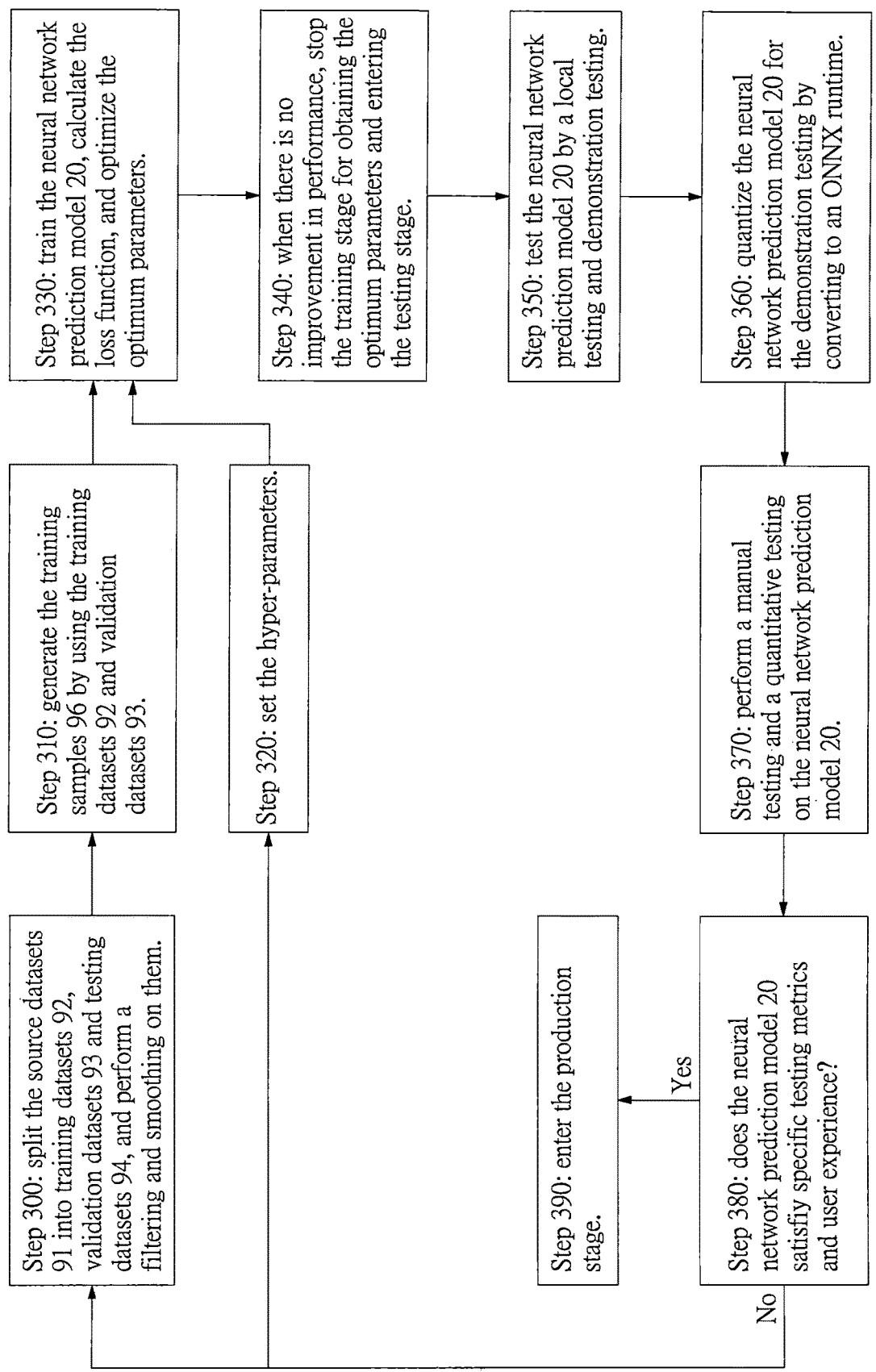
FIG. 8 is a steps flow diagram showing the training and testing of the neural network prediction model of the present invention.

FIGS. 7 and 8 show a structure and a step flow for training and testing the neural network prediction model 20. The digital trajectory prediction system 1 further includes a database 90 and a sample generator 95 which are used in a training stage and a testing stage of the neural network prediction model 20.

The database 90 is connected to the preprocess unit 10 (as shown in FIG. 7). The database 90 serves for storing a plurality of source datasets 91. Each of the source datasets 91 includes a trajectory data with a speed level and a line type. The speed level is selected from a slow level, a fast level and a normal-level. The line type is selected from a low curvature type, a high curvature type, a character type, a straight line type, a circle type and a polyline type. The source datasets 91 of the database 90 are split into a plurality of training datasets 92, a plurality of validation datasets 93 and a plurality of testing datasets 94, which are inputted to the preprocess unit 10 for filtering and smoothing (step 300 in FIG. 8).

The sample generator 95 is connected to the preprocess unit 10 and the neural network prediction model 20. The sample generator 95 serves to receive the training datasets 92 and the validation datasets 93 processed by the preprocess unit 10 for generating a plurality of training samples 96 (step 310 in FIG. 8). Each of the training samples 96 includes a feature and a caption. The feature includes a plurality of sample points used as inputs of the neural network prediction model 20. The caption is a label including expected point coordinates for the feature.

The hyper-parameters are set before the training stage of the neural network prediction model 20 (step 320 in FIG. 8).

Referring to FIG. 8, in the training stage of the neural network prediction model 20, the neural network prediction model 20 is trained through a plurality of epochs. In each of the epochs, the neural network prediction model 20 is trained by using the training samples 96 of the sample generator 95 through a plurality of iterations (step 330). In each of the epochs, the loss function is calculated for a corresponding training dataset 92 and validation dataset 93 to evaluate a performance of the neural network prediction model 20. A plurality of optimum parameters of the neural network prediction model 20 are optimized through the epochs. When there is no improvement in performance of the neural network prediction model 20 detected after a specific number of epochs, the training stage is stopped before a predetermined number of epochs have been completed for obtaining the optimum parameters and entering the testing stage of the neural network prediction model 20 (step 340).

In the testing stage of the neural network prediction model 20, the neural network prediction model 20 is tested by a local testing with the testing datasets 94 from the preprocess unit 10 and a demonstration testing (step 350). The local testing is performed by evaluating a plurality of performance metrics of the neural network prediction model 20 and comparing the performance metrics to a plurality of goal metrics and previous trained models (the neural network prediction models 20 trained at an early time) for detecting trends in improvement of the neural network prediction model 20 and identifying successful strategies for future training variations. When the local testing is completed, the neural network prediction model 20 is quantized and prepared for the demonstration testing by converting the neural network prediction model 20 to an ONNX (Open Neural Network Exchange) runtime to be integrated into a demonstration testing system (step 360), wherein a manual testing and a quantitative testing are performed on the neural network prediction model 20 by using various testing datasets 94 and using drawings of a robotic arm on the input device 600 for evaluating a user experience qualitatively (step 370). A plurality of testing metrics of the neural network prediction model 20 are re-evaluated and compared to previous variations for determining whether the neural network prediction model 20 satisfies specific testing metrics and user experience so as to gain trends and behaviors of the neural network prediction model 20 under different training variables (step 380). The training variables may include an architecture of the neural network prediction model 20, the training datasets 92, the validation datasets 93, and the hyper-parameters.

When the neural network prediction model 20 do not satisfy a specific testing metrics and user experience, the source datasets 91 of the database 90 are inputted to the preprocess unit 10 (step 300) and the hyper-parameters are reset (step 320) for training and testing the neural network prediction model 20 again. The neural network prediction model 20 is repeatedly trained and tested until the neural network prediction model 20 satisfy specific testing metrics and user experience for entering a production stage of the neural network prediction model 20 (step 390).

The advantages of the present invention are that, the present invention provides a system for predicting a future trajectory at specific frequencies to compensate for the delay between the input trajectory on the input device (tablets, e-readers, mobile phones, demonstration screens, touch-screen devices, etc.) and the rendered trajectory on the screen. In the present invention, a neural network prediction model based on machine learning is combined with a non-machine learning model, preprocessing and post-processing for preprocessing the input trajectory, predicting a predicted point to be used as a future input point of the input trajectory at a specific interval, and adjusting the predicted point to obtain an appropriate trajectory to be rendered on the screen, which reduces the latency of the input device. Therefore, the present invention can be used in various cases of writing, sketching and drawing on different input devices with stylus, mouse or user's finger, which provides as realistic user experience as possible for the user.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A digital trajectory prediction system comprising:
   a processor connected to a memory; the processor serving to execute required operations of the digital trajectory prediction system; and the memory serving to store data, programs and related operation results of the digital trajectory prediction system;
   a preprocess unit serving to receive an input trajectory from an input device for preforming a preprocessing on the input trajectory; the input trajectory of the input device being inputted by an input unit; the input trajectory including a plurality of input points which are a recent pre-specified set of coordinates captured by input device; wherein in the preprocessing, the input trajectory is processed by a filtering and a smoothing to form a processed trajectory including a plurality of processed points;
   a neural network prediction model connected to the preprocess unit; the neural network prediction model serving to receive the processed points from the preprocess unit and to output a prediction result including a predicted point; the neural network prediction model using the processed points to form a historical path for predicting the predicted point; the predicted point being used as a new future input point for the input trajectory;
   a post-processing unit connected to the neural network prediction model and the preprocess unit; the post-processing unit serving to receive the prediction result from the neural network prediction model, the input trajectory and the processed trajectory from the preprocess unit, and to perform a post-processing on the prediction result; wherein in the post-processing, the post-processing unit serves to calculate a straightness, an input length and an input speed of the processed trajectory for determining whether to add the predicted point to a render point set to be rendered on a screen; and the render point set includes the input points of the input trajectory;
   a point output unit connected to the post-processing unit, the preprocess unit and the screen; the point output unit serving to receive the render point set outputted from the post-processing unit for rendering the render point set on the screen; and
   wherein in the point output unit, when the predicted point is added to the render point set in the post-processing of the post-processing unit, the input points of the input trajectory and the predicted point are rendered on the screen; and when the predicted point is not added to the render point set in the post-processing of the post-processing unit, only the input points of the input trajectory are rendered on the screen and the predicted point is not rendered on the screen.

2. The digital trajectory prediction system as claimed in claim 1, wherein each of the input points being associated with a time stamp; the processed points have uniform time stamp intervals; the prediction result further includes a prediction length corresponded to the predicted point; the prediction length is a length of a prediction line connected between the predicted point and the processed point which has the latest time stamp in the processed trajectory; and
   wherein the post-processing unit includes a straightness evaluation unit serving to calculate a degree of the straightness of the processed trajectory for determining whether the processed trajectory is a straight line; in the post-processing, the straightness is calculated by a line metric based on a frequency and a magnitude of changes in a direction along the processed trajectory; the straightness is compared with a predetermined straightness threshold; when the straightness is larger than the straightness threshold, the straightness evaluation unit views the processed trajectory as a straight line and extends the prediction length by stretching the prediction line with a predetermined length at an angle of the prediction line for adjusting the location of the predicted point; when the straightness is smaller than the straightness threshold, the processed trajectory is viewed as a non-straight line and the prediction length is not extended and the location of the predicted point is not adjusted.

3. The digital trajectory prediction system as claimed in claim 2, wherein the post-processing unit further includes an input length evaluation unit connected to the straightness evaluation unit; in the straightness evaluation unit, the processed trajectory and the predicted point which is adjusted or not adjusted are outputted to the input length evaluation unit; and
   wherein the input length evaluation unit serves to calculate the input length of the processed trajectory for determining whether the input length is shorter than a predetermined length threshold; and when the input length is shorter than the length threshold, the predicted point is not added to the render point set.

4. The digital trajectory prediction system as claimed in claim 3, wherein the post-processing unit further includes an input speed evaluation unit connected to the input length evaluation unit; in the input length evaluation unit, when the input length is longer than the length threshold, the input length evaluation unit outputs the processed trajectory and the predicted point to the input speed evaluation unit; the input speed evaluation unit serves to calculate the input speed of the processed trajectory by using the input length and the time stamps of processed trajectory for determining whether the input speed is higher than a predetermined speed threshold; when the input speed is higher than the speed threshold, the predicted point is added to the render point set; and when the input speed is lower than the speed threshold, the predicted point is not added to the render point set.

5. The digital trajectory prediction system as claimed in claim 1, wherein when the point output unit renders the render point set on the screen, the preprocess unit is controlled to perform the preprocessing again for processing a next input trajectory from the input device.

6. The digital trajectory prediction system as claimed in claim 1, wherein in the filtering and the smoothing of the preprocessing, the input points are resampled and smoothed through a Bézier curve approximation to form the processed points which have uniform time stamp intervals.

7. The digital trajectory prediction system as claimed in claim 6, wherein the time stamp interval between each two consecutive processed points of processed trajectory is 8 ms (millisecond).

8. The digital trajectory prediction system as claimed in claim 1, wherein the neural network prediction model is formed by deep neural networks (DNN) using deep learning.

9. The digital trajectory prediction system as claimed in claim 4, wherein the point output unit includes a current location evaluation unit connected to the input device; when the render point set includes the predicted point, the current location evaluation unit serves to evaluate the location of the predicted point against a current location of the input unit on the input device for deciding whether to shorten the prediction length to adjust the location of the predicted point before rendering of the predicted point; the current location of the input unit is a location of a latest recorded input point of the input device and the latest recorded input point is not rendered yet on the screen due to a processing latency; and when the location of the predicted point exceeds the current location of the input unit, the prediction length is cut back for adjusting the location of the predicted point, which avoids the location of the predicted point exceeds the current location of the input unit on the input device.

10. The digital trajectory prediction system as claimed in claim 5, further comprising a prediction metric update unit connected to the post-processing unit, the neural network prediction model and the preprocess unit; wherein when the point output unit renders the render point set on the screen and controls the control the preprocess unit to perform the preprocessing again, the prediction metric update unit serves to calculate a plurality of prediction metrics; the prediction metrics serve for comparing a plurality of predicted points and a plurality of actual recorded input points; the predicted points are obtained by the neural network prediction model for a specific number of consecutive input trajectories inputted to the preprocess unit over a predetermined analysis period of time; each of the predicted points is corresponded to a respective one actual recorded input point which is recorded by the input device at a later time; and the prediction metric update unit updates the prediction metrics for each of the input trajectories.

11. The digital trajectory prediction system as claimed in claim 10, wherein the plurality of prediction metrics are three prediction metrics which are an average distance error (ADE), an average angle error (AAE) and an average prediction time (APT); in calculating of the three prediction metrics, a total number of the predicted points over the predetermined analysis period of time is defined as n; each of the predicted points is represented as $(X_{p_i}, Y_{p_i})$, $1 \le i \le n$; each of the actual recorded input points is represented as $(X_{t_i}, Y_{t_i})$, $1 \le i \le n$; a prediction time of each of the predicted points is represented as $PT_i$, $1 \le i \le n$; a predicted vector corresponded to predicted points is represented as the $A=(A_1, A_2, \ldots A_{n-1}, A_n)$; a ground truth vector corresponded to the predicted points is represented as $B=(B_1, B_2, \ldots B_{n-1}, B_n)$; and wherein the three prediction metrics are:

$$ADE = \frac{\sum_{i=1}^{n} \sqrt{(X_{p_i} - V_{t_i})^2 + (Y_{p_i} - Y_{t_i})^2}}{n}$$

$$AAE = \cos^{-1} \frac{A \cdot B}{\|A\|\|B\|} = \cos^{-1} \frac{\sum_{i=1}^{n} A_i B_i}{\sqrt{\sum_{i=1}^{n} A_i^2} \times \sqrt{\sum_{i=1}^{n} B_i^2}}, \text{ and}$$

$$APT = \frac{\sum_{i=1}^{n} PT_i}{n}.$$

12. The digital trajectory prediction system as claimed in claim 11, wherein the neural network prediction model includes a first consecutive convolutional layer, a second consecutive convolutional layer, a gated recurrent unit, a first dense layer, a second dense layer and a first matrix multiplication layer; the second consecutive convolutional layer is connected to the first consecutive convolutional layer; the gated recurrent unit is connected to the second consecutive convolutional layer; the first dense layer and the second dense layer are connected to the gated recurrent unit; and wherein in the predicting of the neural network prediction model, the processed points inputted to the neural network prediction model are passed through the first consecutive convolutional layer, the second consecutive convolutional layer and the gated recurrent unit in sequence; two outputs of the gated recurrent unit are passed to the first dense layer and the second dense layer respectively; the first dense layer is a representation of the prediction time, and the second dense layer is a representation of a position, a speed and a plurality of acceleration vectors; two outputs of the first dense layer are passed to a first square layer and a concatenate layer respectively; an output of the first square layer is passed to the concatenate layer; an output of the second dense layer is passed to a reshape layer; the first matrix multiplication layer receives an output of the concatenate layer and an output of the reshape layer for evaluating coordinates of the predicted point; the reshape layer is connected to a second matrix multiplication layer which serves for predicting 8 candidate points; in the evaluating of the first matrix multiplication layer, one of the 8 candidate points is selected as the predicted point to be outputted based on the three prediction metrics;

wherein in the neural network prediction model, the predicted point is represented as $(X_p, Y_p) = (a_x, a_y) * 0.5 t^2 + (v_x, v_y) * t$, wherein $a_x$ and $a_y$ are components of an acceleration, and $v_x$ and $v_y$ are components of a speed; and wherein the neural network prediction model further includes an input predict time layer, a second square layer connected to the input predict time layer, a stack layer connected to the input predict time layer, the second square layer and the second matrix multiplication layer.

13. The digital trajectory prediction system as claimed in claim 12, wherein the neural network prediction model has a plurality of model parameters which are trained based on a loss function; the loss function is defined by the average distance loss (ADL), the average angle loss (AAL), the average prediction time loss (APTL), a prediction time variance loss (PTVL), a slope change loss (SCL), a velocity change loss (VCL), and a plurality of hyper-parameters which are represented as $c_{ADL}$, $c_{AAL}$, $c_{APTL}$, $c_{PTVL}$, $c_{SCL}$ and $c_{VCL}$;

wherein the ADL, AAL and APTL have the same definition as the ADE, AAE and APT, respectively; the PTVL is a variance of the prediction times of the n predicted points 81 over the predetermined analysis period of time; the SCL is a slope change of n input points 61 over the predetermined analysis period of time; the VCL is a velocity change of the n input points over the predetermined analysis period of time; and the loss function is represented as:

$$Loss = c_{ADL}ADL + c_{AAL}AAL + c_{APTL}APTL + c_{PTVL}PTVL + c_{SCL}SCL + c_{VCL}VCL.$$

14. The digital trajectory prediction system as claimed in claim 1, further comprising a database and a sample generator which are used in a training stage and a testing stage of the neural network prediction model;

wherein the database is connected to the preprocess unit; the database serves for storing a plurality of source datasets; the source datasets of the database are split into a plurality of training datasets, a plurality of validation datasets and a plurality of testing datasets, which are inputted to the preprocess unit for filtering and smoothing;

wherein the sample generator is connected to the preprocess unit and the neural network prediction model; the sample generator serves to receive the training datasets and the validation datasets processed by the preprocess unit for generating a plurality of training samples; and wherein the hyper-parameters are set before a training stage of the neural network prediction model.

15. The digital trajectory prediction system as claimed in claim 14, wherein in the training stage of the neural network prediction model, the neural network prediction model is trained through a plurality of epochs; in each of the epochs, the neural network prediction model is trained by using the training samples of the sample generator through a plurality of iterations; in each of the epochs, a loss function is calculated for a corresponding training dataset and validation dataset to evaluate a performance of the neural network prediction model; a plurality of optimum parameters of the neural network prediction model are optimized through the epochs; when there is no improvement in performance of the neural network prediction model detected after a specific number of epochs, the training stage is stopped before a predetermined number of epochs have been completed for obtaining the optimum parameters and entering the testing stage of the neural network prediction model.

16. The digital trajectory prediction system as claimed in claim 15, wherein in the testing stage of the neural network prediction model, the neural network prediction model is tested by a local testing with the testing datasets from the preprocess unit and a demonstration testing; the local testing is performed by evaluating a plurality of performance metrics of the neural network prediction model and comparing the performance metrics to a plurality of goal metrics and previous trained models for detecting trends in improvement of the neural network prediction model and identifying successful strategies for future training variations; when the local testing is completed, the neural network prediction model is quantized and prepared for the demonstration testing by converting the neural network prediction model to an ONNX (Open Neural Network Exchange) runtime to be integrated into a demonstration testing system, wherein a manual testing and a quantitative testing are performed on the neural network prediction model by using various testing datasets and using drawings of a robotic arm on the input device for evaluating a user experience qualitatively; a plurality of testing metrics of the neural network prediction model are re-evaluated and compared to previous variations for determining whether the neural network prediction model satisfies specific testing metrics and user experience so as to gain trends and behaviors of the neural network prediction model under different training variables; the training variables include an architecture of the neural network prediction model, the training datasets, the validation datasets, and the hyper-parameters; and wherein when the neural network prediction model do not satisfy a specific testing metrics and user experience, the source datasets of the database are inputted to the preprocess unit and the hyper-parameters are reset for training and testing the neural network prediction model again; the neural network prediction model is repeatedly trained and tested until the neural network prediction model satisfy specific testing metrics and user experience for entering a production stage of the neural network prediction model.

17. The digital trajectory prediction system as claimed in claim 14, wherein each of the source datasets includes a trajectory data with a speed level and a line type; The speed level is selected from a slow level, a fast level and a normal level; the line type is selected from a low curvature type, a high curvature type, a character type, a straight line type, a circle type and a polyline type; and wherein each of the training samples includes a feature and a caption; the feature includes a plurality of points used as inputs of the neural network prediction model; and the caption is a label including expected point coordinates for the feature.

18. The digital trajectory prediction system as claimed in claim 1, wherein the input device is selected from a mobile phone, a tablet, an e-reader, a demonstration screen or a touchscreen device; and the input unit is selected from a stylus, a mouse or fingers of a user.

* * * * *